United States Patent
Gaunt

[19]

[11] Patent Number: 6,138,954
[45] Date of Patent: Oct. 31, 2000

[54] AIRCRAFT FUNNEL SLAT SYSTEM

[76] Inventor: John J. Gaunt, 35 William Street, Reading, Berkshire, England RG1 7DE, United Kingdom

[21] Appl. No.: 09/135,386

[22] Filed: Aug. 17, 1998

[51] Int. Cl.[7] .................................................. B64C 9/22
[52] U.S. Cl. ......................... 244/198; 244/214; 244/45 A
[58] Field of Search ................................... 244/198, 214, 244/218, 210, 45 R, 45 A

[56] References Cited

U.S. PATENT DOCUMENTS

| | | | |
|---|---|---|---|
| 1,755,540 | 4/1930 | Gunn | 244/218 |
| 1,777,279 | 10/1930 | Anderson | 244/210 |
| 1,818,309 | 8/1931 | De Villard | 244/210 |
| 1,830,019 | 11/1931 | Davis | 244/210 |
| 2,025,561 | 12/1935 | Wilford | 244/210 |
| 2,172,370 | 9/1939 | Fahrney | 244/210 |
| 2,361,574 | 10/1944 | Tampier | 244/210 |
| 2,716,460 | 8/1955 | Young | 244/214 |

FOREIGN PATENT DOCUMENTS

| | | | |
|---|---|---|---|
| 799840 | 6/1936 | France | 244/218 |
| 921308 | 5/1947 | France | 244/218 |
| 4-339097 | 11/1992 | Japan | 244/218 |

*Primary Examiner*—Galen L. Barefoot
*Attorney, Agent, or Firm*—Ourpal (R) Asija

[57] ABSTRACT

Aircraft air funnel slat system of this invention for increased lift to aircraft wings and rotors comprises a pair of symmetrical and retractable slats or flaps or planks or other similarly shaped strong rigid and light weight rectangular members angled above the leading edge of aircraft wings so as to form a funnel over each wing so as to provide increased airspeed above the wing and increased lift from below the wing, which in turn greatly reduces the take off and landing distance so as to result in V/STOL aircraft.

2 Claims, 2 Drawing Sheets

AIRCRAFT FUNNEL SLAT SYSTEM

BACKGROUND

This invention relates to methods, device and systems for increasing the lift of all types of aircrafts. More particularly it relates to a means for increasing the lift to aircraft wings and rotors by adding a slat (or a flap) over the leading edge of each aerofoil wing to form a funnel which in turn provides increased airspeed above the wing and hence increased lift from below the wing or the aerofoil. This turn permits VSTOL (Very Short Take off and Landing) operations.

THE PROBLEM

The problems with prior art aerofoils and aircraft systems is that they typically require a very long paved smooth runway for take off and landing typically of the order of several thousand feet or meters depending upon the size and design of the aircraft.

Furthermore in order to optimize the cruise speed prior art aircrafts have limited lift, which does not make them practical in remote areas. For the same reason they are not cost effective.

SUMMARY

The aircraft air funnel flat system for increased lift to aircraft wings and rotors of this invention, as the name implies, comprises a slat angled above the leading edge of aircraft wing so as to form a funnel which in turn provides increased airspeed above the wing and increased lift from below the wing, which in turn greatly reduce the take off and landing distance. In order to achieve optimum cruise efficiency the telescopic slats retract to in or over the wing and or fuselage. Optionally slats can also be used as secondary aerofoils above and parallel to the wing for increase cruise efficiency. Similar lift benefit is also achieved in helicopters when a slat is applied to each blade of the rotor on the leading edge in spite of the counter half cycle. This in turn facilitates short take off and landing.

PRIOR ART

A prior art patentability search was neither commissioned nor conducted by the inventor, but the inventor is intimately familiar with the prior art. Many inventors have designed V/STOL—Vertical/Short Take Off & Landing aircraft systems but with great expense and complexity. The solution provided by this inventor is elegantly simple.

Unfortunately none of the prior art devices singly or even in combination provide all of the features and objectives established by the inventor for this system as enumerated below.

OBJECTIVES

1. It is an objective of this invention to provide method, devices and system for increasing the lift of an aircraft.

2. Another objective of this invention is to provide an aircraft system suitable for very short take off and landings.

3. Another objective of this invention is that it use little or no additional power or energy.

4. Another objective of this invention is that it is easy to use even intuitive that requires little additional training.

5. Another objective of this invention is that the slat or flap system of this invention is integrated and streamlined to the aircraft.

6. Another objective of this invention is that it be physically safe in normal environment as well as accidental situations.

7. Another objective of this invention is that it be environmentally friendly.

8. Another objective of this invention is that it be made of modular units easily interface-able to each other.

9. Another objective of this invention is that it meet all federal, state, local and other private standards, guidelines and recommendations with respect to safety, environment, quality and energy consumption.

10. Another objective of this invention is that it permit landing and take off of large aircrafts in remote areas for replenishing of supplies, ammunition and personnel at the point or line of action without having to build and expensive runway.

11. Another objective of this invention is that it be elegantly simple in concept and design.

12. Another objective of this invention is that it be applicable to retrofit as well as OEM market.

13. Another objective of this invention is that it be easy to install, de-install, transport and store.

14. Another objective of this invention is that it be applicable to all types of aircraft and rotor-crafts for example airplanes, helicopters, drones etc.

15. Another objective of this invention is that the interface between wing and slat be such that it is easily retractable so as to not interfere with the cruise characteristics of an aircraft.

16. Another objective of this invention is that it can be adapted for other uses.

17. Another objective of an alternate embodiment of this invention is to design and position the slat as s secondary aerofoil above and parallel to the wing.

18. Another objective of this invention is to maximize the slat strength to weight ratio.

19. Another objective of this invention is that the slats or flaps be telescopic to retract or designed so as not to interfere with the cruise speed of the aircraft.

20. Other objectives of this invention reside in its simplicity, elegance of design, ease of manufacture, service and use and even aesthetics as will become apparent from the following brief description of the drawings and concomitant description.

OPERATION

Figure 1A:
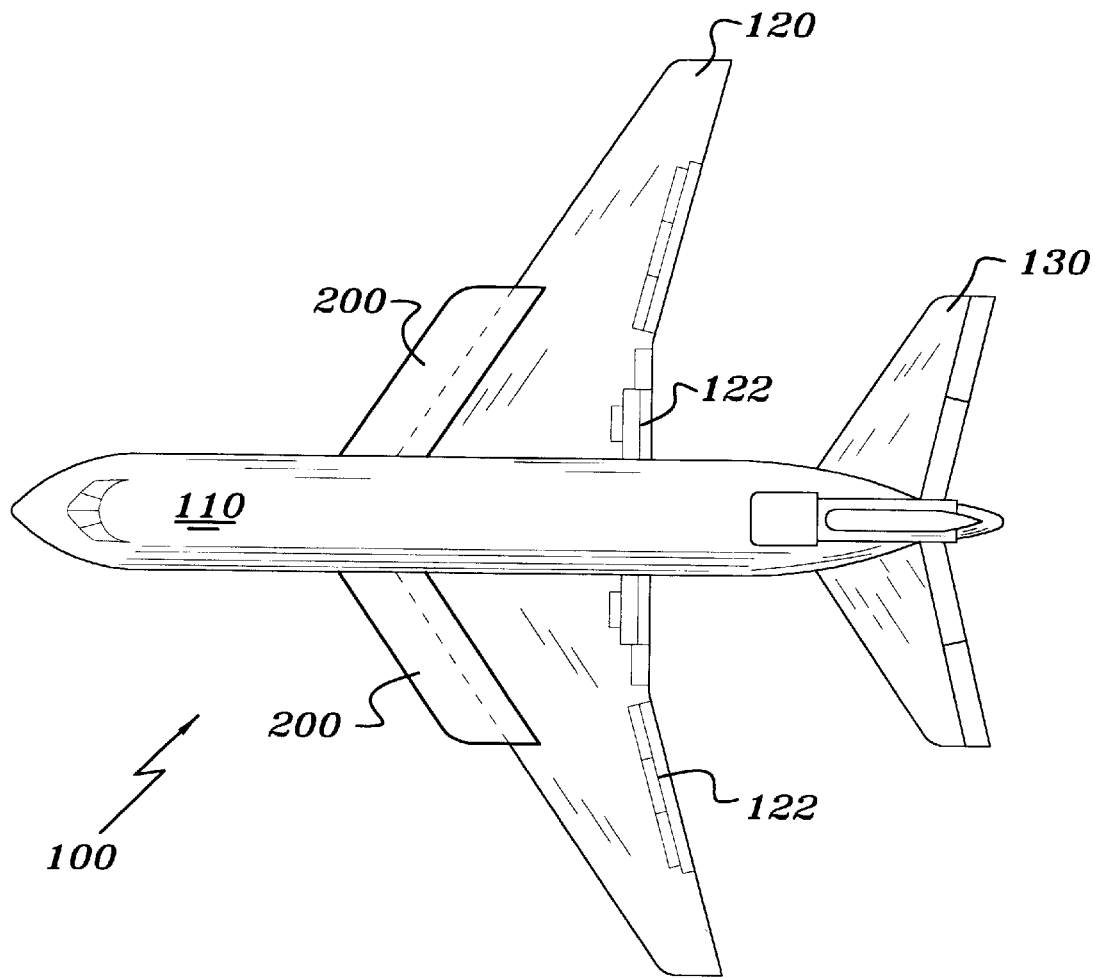
FIG. 1(a) is a top plan view of an aircraft which shows the position of the slats.
Figure 1B:
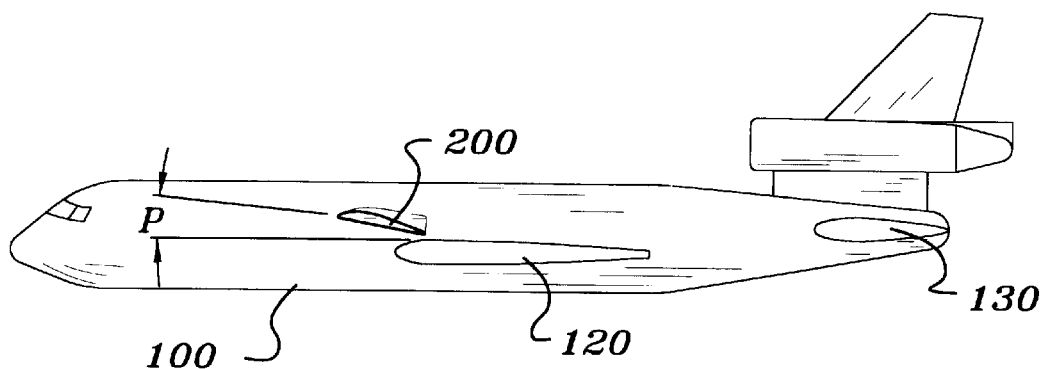
FIG. 1(b) is a side elevation thereof.
Figure 1C:
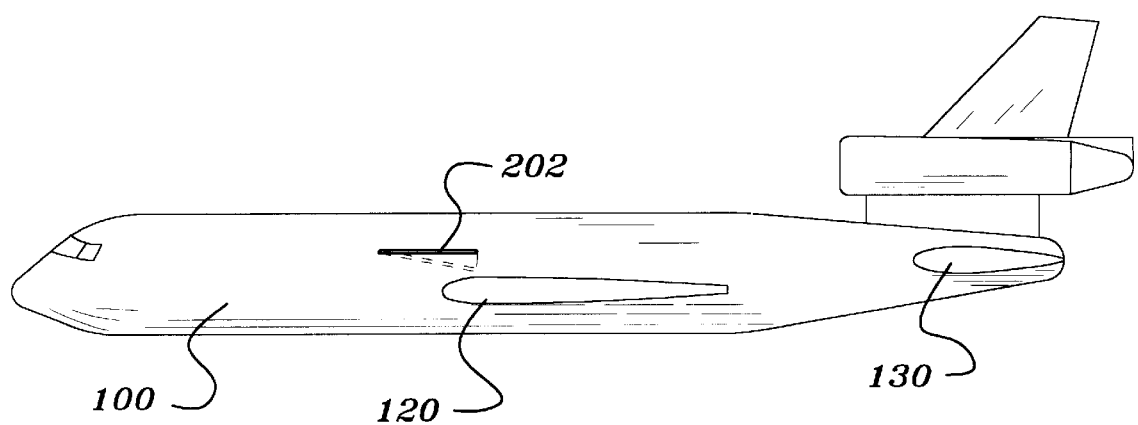
FIG. 1(c) is a side view of the aircraft with slat as an aerofoil above and parallel to the wing.

The operation and use of the aircraft air funnel slat system for increased lift to aircraft wings and rotors of this invention is simple and even intuitive. Nonetheless the inventor recommends the pilot adjust the slat angle above and slightly in front of wing to funnel more air above and over the top of the wing to provide more lift on take off and landing to greatly improve short take off and landing capabilities. The slat or flap is customized for each aircraft for peak performance and no turbulence.

The inventor has given a non-limiting description of the oil changing system of this invention. Due to the simplicity and elegance of the design of this invention designing around it is very difficult if not impossible. Nonetheless many changes may be made to this design without deviating from the spirit of this invention. Examples of such contemplated variations include the following:

1. The shape and size of the various members and components may be modified.
2. The color, aesthetics and materials may be enhanced or varied.
3. The slats may be of strong light weight rigid material and optionally aerofoil shaped.
4. Additional complimentary and complementary functions and features may be added.
5. The slats or flaps may be stowed differently.
6. The slats may be made telescopic.
7. The slats may be in modular section where in some or all of the sections are adjustable in angle and position over the leading edge of the wings. In other words some sections (for example middle third) may be adjustable and some fixed for example outer ⅔ or ⅓ on each end of slat.
8. The slats may span the entire length of the wings.
9. The overlap between the slat and the wing may be modified even to the point of no overlap.
10. The adjustable range of angle between the slat and the wing may be reduced.
11. The slat may be stowed in fuselage instead of in or over the wing.
12. The means for changing the angle of incidence of slat to the wing may be changed from hydraulic arms to another means for accomplishing the same result.
13. The leading edge slats or flaps may be used as secondary aerofoils above the wings.
14. The rigidity, strength, thickness and width of the slat may be changed.
15. The shape of the slat as an aerofoil may be changed, modified or streamlines.
16. the concept may be extended to drones and gliders.

Other changes such as aesthetics and substitution of newer materials as they become available, which substantially perform the same function in substantially the same manner with substantially the same result without deviating from the spirit of the invention may be made.

Following is a listing of the components used in this embodiment arranged in ascending order of the reference numerals for ready reference of the reader.

100=Aircraft generally eg an airplane, helicopter, drone or glider etc.
110=Fuselage of the aircraft for stowing telescopic slat.
120=wing of the aircraft.
122=Trailing edge flaps
130=Tail section of the aircraft
200=SLAT or Flap or any rectangular member with light weight, high strength and rigidity positioned over the wing.
202=Slat as an aerofoil above and over the wing so as to act as a secondary wing to provide additional lift during cruise.

A great care has been taken to use words with their conventional dictionary definitions. Following definitions are included here for clarification.

3D=Three Dimensional
Aerofoil=A body shaped to produce lift as it travels through the air.
Angle of Attack=The angle of tilt of an aircraft wing whereby leading edge is higher than the trailing edge.
DIY=Do It Yourself
Integrated=Combination of two entities to act like one
Interface=Junction between two dissimilar entities
Retro-Thrust=Additional trust or drag provided by engines in reverse, which helps in reducing the STOL distance.
SLAT=A flap or other rectangular plank or the like as thin and strong as possible
Symmetrical=The shape of an object of integrated entity which can be divided into two along some axis through the object or the integrated entity such that the two halves form mirror image of each other.
Turbulence=Break up of laminar air flow. Excessive angle of attack leads to boundary layer separation of laminar air flow and hence the turbulence.
V/STOL=Vertical/Short Take Off and Landing While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefor contemplated that the appended claim(s) cover any such modifications, embodiments as fall within the true scope of this invention.

The Inventor claims:

1. An aircraft air funnel slat system for increased lift to aircraft wings each having a leading edge comprising a pivot-able slat positioned over and above each wing so as to form a funnel between said slat and said wing and wherein said slat is adjustable from a position 'parallel to said wing' to 'tangentially touching said wing' and wherein said slat is in the shape of an airfoil and wherein said slat pivots about the leading edge of said slat.

2. The aircraft air funnel slat system of claim 1 wherein said pivot-able slat length is from ten percent to ninety percent of the longitudinal wingspan and wherein said slat width is from ten percent to ninety percent of the width of said wing.

* * * * *